United States Patent
Lohia et al.

(10) Patent No.: US 11,636,386 B2
(45) Date of Patent: Apr. 25, 2023

(54) DETERMINING DATA REPRESENTATIVE OF BIAS WITHIN A MODEL

(71) Applicant: International Business Machines Corporation, Armonk, NY (US)

(72) Inventors: Pranay Kumar Lohia, Bangalore (IN); Diptikalyan Saha, Bangalore (IN); Manish Anand Bhide, Hyderabad (IN); Sameep Mehta, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 699 days.

(21) Appl. No.: 16/690,686

(22) Filed: Nov. 21, 2019

(65) Prior Publication Data

US 2021/0158102 A1 May 27, 2021

(51) Int. Cl.
*G06N 20/00* (2019.01)
*G06K 9/62* (2022.01)
*G06N 7/00* (2023.01)
*G06F 21/62* (2013.01)

(52) U.S. Cl.
CPC .......... *G06N 20/00* (2019.01); *G06K 9/6256* (2013.01); *G06K 9/6262* (2013.01); *G06K 9/6298* (2013.01); *G06N 7/00* (2013.01); *G06F 21/6254* (2013.01)

(58) Field of Classification Search
CPC ........ G06N 20/00; G06N 7/00; G06K 9/6256; G06K 9/6262; G06K 9/6298; G06F 21/6254
See application file for complete search history.

(56) References Cited

U.S. PATENT DOCUMENTS

| | | | |
|---|---|---|---|
| 11,416,743 B2* | 8/2022 | Baughman | G06N 3/063 |
| 2011/0289025 A1 | 11/2011 | Yan et al. | |
| 2015/0125072 A1 | 5/2015 | Mitarai et al. | |
| 2015/0379429 A1 | 12/2015 | Lee et al. | |

(Continued)

FOREIGN PATENT DOCUMENTS

EP   3101599 A2   12/2016

OTHER PUBLICATIONS

Nachum et al., "Identifying and Correcting Label Bias in Machine Learning" Jan. 7, 2019, U.S. Appl. No. 62/789,115. (Year: 2019).*

(Continued)

*Primary Examiner* — Ying Yu Chen
*Assistant Examiner* — Chase P. Hinckley
(74) *Attorney, Agent, or Firm* — Ryan, Mason & Lewis, LLP

(57) ABSTRACT

Methods, systems, and computer program products for determining data representative of bias within a model are provided herein. A computer-implemented method includes obtaining a first dataset on which a model was trained, wherein the first dataset contains protected attributes, and a second dataset on which the model was trained, wherein the protected attributes have been removed from the second dataset; identifying, for each of the one or more protected attributes in the first dataset, one or more attributes in the second dataset correlated therewith; determining bias among at least a portion of the identified correlated attributes; and outputting, to at least one user, identifying information pertaining to the one or more instances of bias.

16 Claims, 6 Drawing Sheets

(56) References Cited

U.S. PATENT DOCUMENTS

| | | | |
|---|---|---|---|
| 2017/0330058 A1 | 11/2017 | Silberman et al. | |
| 2018/0121817 A1* | 5/2018 | Datta | G06N 7/005 |
| 2019/0026345 A1 | 1/2019 | Bezzi | |
| 2019/0188605 A1 | 6/2019 | Zavesky | |
| 2019/0378210 A1* | 12/2019 | Merrill | G06N 5/02 |
| 2020/0081865 A1* | 3/2020 | Farrar | G06K 9/6218 |
| 2020/0082299 A1* | 3/2020 | Vasconcelos | G06N 20/00 |
| 2020/0117582 A1* | 4/2020 | Srivastava | G06F 11/3684 |
| 2020/0184350 A1* | 6/2020 | Bhide | G06N 20/20 |
| 2020/0302524 A1* | 9/2020 | Kamkar | G06N 3/084 |
| 2020/0311486 A1* | 10/2020 | Dey | G06F 9/542 |
| 2020/0320428 A1* | 10/2020 | Chaloulos | G06N 20/00 |
| 2020/0372290 A1* | 11/2020 | Tristan | G06Q 10/04 |
| 2020/0372304 A1* | 11/2020 | Kenthapadi | G06F 16/285 |
| 2020/0372406 A1* | 11/2020 | Wick | G06N 20/00 |
| 2020/0410129 A1* | 12/2020 | Nadler | G06K 9/6256 |
| 2021/0049503 A1* | 2/2021 | Nourian | G06N 7/023 |
| 2021/0117830 A1* | 4/2021 | Inakoshi | G06K 9/6257 |
| 2022/0036203 A1* | 2/2022 | Nachum | G06N 20/00 |

OTHER PUBLICATIONS

Lohia et al., "Bias Mitigation Post-Processing for Individual and Group Bias" Dec. 12, 2018, arXiv:1812.06135v1. (Year: 2018).*
Bellamy et al., "AI Fairness 360: An Extensible Toolkit for Detecting, Understanding, and Mitigating Unwanted Algorithmic Bias" Oct. 3, 2018, arXiv: 1810.01943v1, pp. 1-20. (Year: 2018).*
Yurochkin et al., "Learning Fair Predictors with Sensitive Subspace Robustness"Jun. 28, 2019, arXiv: 1907.00020v1, pp. 1-23. (Year : 2019).*
Berk et al., "A Convex Framework for Fair Regression" Jun. 7, 2017, arXiv: 1706.02409v1, pp. 1-15. (Year: 2017).*
Lahoti et al., "iFair: Learning Individually Fair Data Representations for Algorithmic Decision Making" Feb. 6, 2019, arXiv: 1806.01059v2, pp. 1-12. (Year: 2019).*
Feng et al., "Learning Fair Representations via an Adversarial Framework" Apr. 30, 2019, arXiv: 1904.13341v1, pp. 1-12. (Year: 2019).*
Goodfellow et al., "Deep Learning" 2016, pp. 1-763. (Year: 2016).*
Agarwal et al., "Fair Regression: Quantitative Definitions and Reduction-Based Algorithms" May 30, 2019, arXiv: 1905.12843v1, pp. 1-18. (Year: 2019).*
Schuster et al., "Towards Debiasing Fact Verification Models" Aug. 31, 2019, arXiv:1908.05267v2, pp. 1-9. (Year: 2019).*
Iosifidis et Ntoutsi, "AdaFair: Cumulative Fairness Adaptive Boosting" Sep. 17, 2019, arXiv:1909.08982v1, pp. 1-11. (Year: 2019).*
Bahng et al., "Learning De-Biased Representations with Biased Representations" Oct. 7, 2019, arXiv: 1910.02806v1, pp. 1-17. (Year :2019).*
Mahabadi et Henderson, "Simple but Effective Techniques to Reduce Dataset Biases" Sep. 25, 2019, arXiv: 1909.06321v2, pp. 1-11 . (Year: 2019).*
Narasimhan et al., "Pairwise Fairness for Ranking and Regression" Aug. 12, 2019, arXiv: 1906.05330v2, pp. 1-17. (Year: 2019).*
Martinez-Plumed et al., "Fairness and Missing Values" May 29, 2019, arXiv: 1905.12728v1, pp. 1-21. (Year: 2019).*
Coston et al., "Fair Transfer Learning with Missing Protected Attributes" Jan. 2019, pp. 91-98. (Year: 2019).*
Bryant et al., "Analysis Bias in Sensitive Personal Information Used to Train Financial Models" Nov. 9, 2019, arXiv: 1911.03623v1, pp. 1-5. (Year: 2019).*
Dwork et Ilvento, "Fairness under Composition" Nov. 20, 2018, arXiv: 1806.06122v2, pp. 1-72. (Year: 2018).*
Wang et al., "Practical Compositional Fairness: Understanding Fairness in Multi-Task ML Systems" Nov. 6, 2019, arXiv: 1911.01916v2, pp. 1-18. (Year: 2019).*
Wang et al., "Bias Also Matters: Bias Attribution for Deep Neural Network Explanation" Nov. 26, 2018, pp. 1-9. (Year: 2018).*
Aumuller et al., "Fair Near Neighbor Search: Independent Range Sampling in High Dimensions" Jun. 5, 2019, arXiv: 1906.01859v1, pp. 1-19. (Year: 2019).*
Jia et al., "Efficient Task-Specific Data Valuation for Nearest Neighbor Algorithms" Sep. 11, 2019, arXiv: 1908.08619v3, pp. 1-49. (Year: 2019).*
Zabalas et al. Machine Learning Algorithm Validation with a Limited Sample Size, Nov. 7, 2019, PLOS One, 20 pages. https://journals.plos.org/plosone/article?id=10.1371/journal.pone.0224365 (Year: 2019).
Raschka, Model Evaluation, Model Selection, and Algorithm Selection in Machine Learning, Dec. 3, 2018 Cornell University Version 2, 49 pages. https://arxiv.org/abs/1811.12808v2 (Year: 2018).
Guyon et al. Gene Selection for Cancer Classification Using Support Vector Machines, Jan. 2002, Machine Learning vol. 46, pp. 389-422. https://link.springer.com/article/10.1023/A:1012487302797 (Year:2002).
Nasiriani et al., Hierarchical Clustering for Discrimination Discovery: A Top-Down Approach, Jun. 2019.
Wakchaure et al., An Empirical Evaluation of various Discrimination Measures for Discrimination Prevention, Nov. 2018.
Zhang et al., "A causal framework for discovering and removing direct and indirect discrimination." arXiv preprint arXiv:1611.07509, Nov. 2016.
Priya et al., Identification of Direct and Indirect Discrimination in Data Mining, Advances in Information Science and Applications— vol. I, 2014.
Hajian et al., A methodology for direct and indirect discrimination prevention in data mining. IEEE transactions on knowledge and data engineering 25.7 (2012): 1445-1459.
SciKit-learn.org, sklearn.neighbors.KNeighborsClassifier, https://scikit-learn.org/stable/modules/generated/sklearn.neighbors.KNeighborsClassifier.html#sklearn.neighbors.KNeighborsClassifier, Jun. 12, 2019.
Srinivasan et al., "Machine learning approaches to estimating software development effort." IEEE Transactions on Software Engineering 21.2 (1995): 126-137.

* cited by examiner

US 11,636,386 B2

DETERMINING DATA REPRESENTATIVE OF BIAS WITHIN A MODEL

FIELD

The present application generally relates to information technology and, more particularly, to data management techniques.

BACKGROUND

Model providers commonly aim to create a model which does not produce any discriminatory or biased behavior. In an attempt to meet such an objectives, existing data management approaches include training a model to remove protected attributes so that the output of the model is unaffected by the presence of such attributes. However, due to the presence of possible correlations between protected attributes and non-protected attributes, bias may persist in such a model.

SUMMARY

In one embodiment of the present invention, techniques for determining data representative of bias within a model are provided. An exemplary computer-implemented method can include obtaining, as input, (i) a first dataset on which a model was trained, wherein the first dataset contains one or more protected attributes, and (ii) a second dataset on which the model was trained, wherein the one or more protected attributes have been removed from the second dataset. Such a method also includes identifying, for each of the one or more protected attributes in the first dataset, one or more attributes in the second dataset correlated therewith, and determining bias among at least a portion of the identified correlated attributes. In such a method, determining bias includes mapping at least two classes of data points associated with the correlated attributes in the second dataset to a set of values associated with the one or more protected attributes in the first dataset, and identifying one or more instances of bias by observing a change to one or more of the values in the mappings in response to modifying one or more class designations among the data points in the mappings. Further, such a method includes outputting, to at least one user, identifying information pertaining to the one or more instances of bias.

In another embodiment, an exemplary computer-implemented method can include identifying, for each of the one or more protected attributes, one or more attributes in the second dataset correlated therewith by cross-validating, in connection with at least a portion of the attributes in the second data set and the one or more protected attributes in the first dataset, a logistic regression model for one or more categorical features and a linear regression model for one or more numerical features. Such a method can also include determining bias among at least a portion of the correlated attributes by: mapping two classes of data points associated with the correlated attributes in the second dataset to a set of values associated with the one or more protected attributes in the first dataset, wherein the two classes of data comprise a majority class and a minority class, distinguished in accordance with a predetermined threshold value; and identifying one or more instances of bias by observing a change to one or more of the values in the mappings in response to modifying one or more class designations among the data points in the mappings. Further, such a method can additionally include carrying out one or more automated actions in connection with the one or more instances of bias.

Yet another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes identifying exhaustive cases in data wherein a model indicates predominant indirect individual bias. Such an embodiment includes identifying one or more sets of non-sensitive attributes and one or more combinations of non-sensitive attributes which are responsible for indirect individual bias in the model. Additionally, such an embodiment includes identifying exhaustive and predominant indirect majority and indirect minority values which are responsible for indirect individual bias in the model. As used herein, "majority values" refer to privileged groups (that is, groups receiving a more favorable outcome), while "minority values" refer to unprivileged groups (that is, groups receiving a less favorable outcome). Further, such an embodiment also includes identifying one or more data points representative of the model having indirect individual bias with respect to the relevant attributes.

Figure 1:
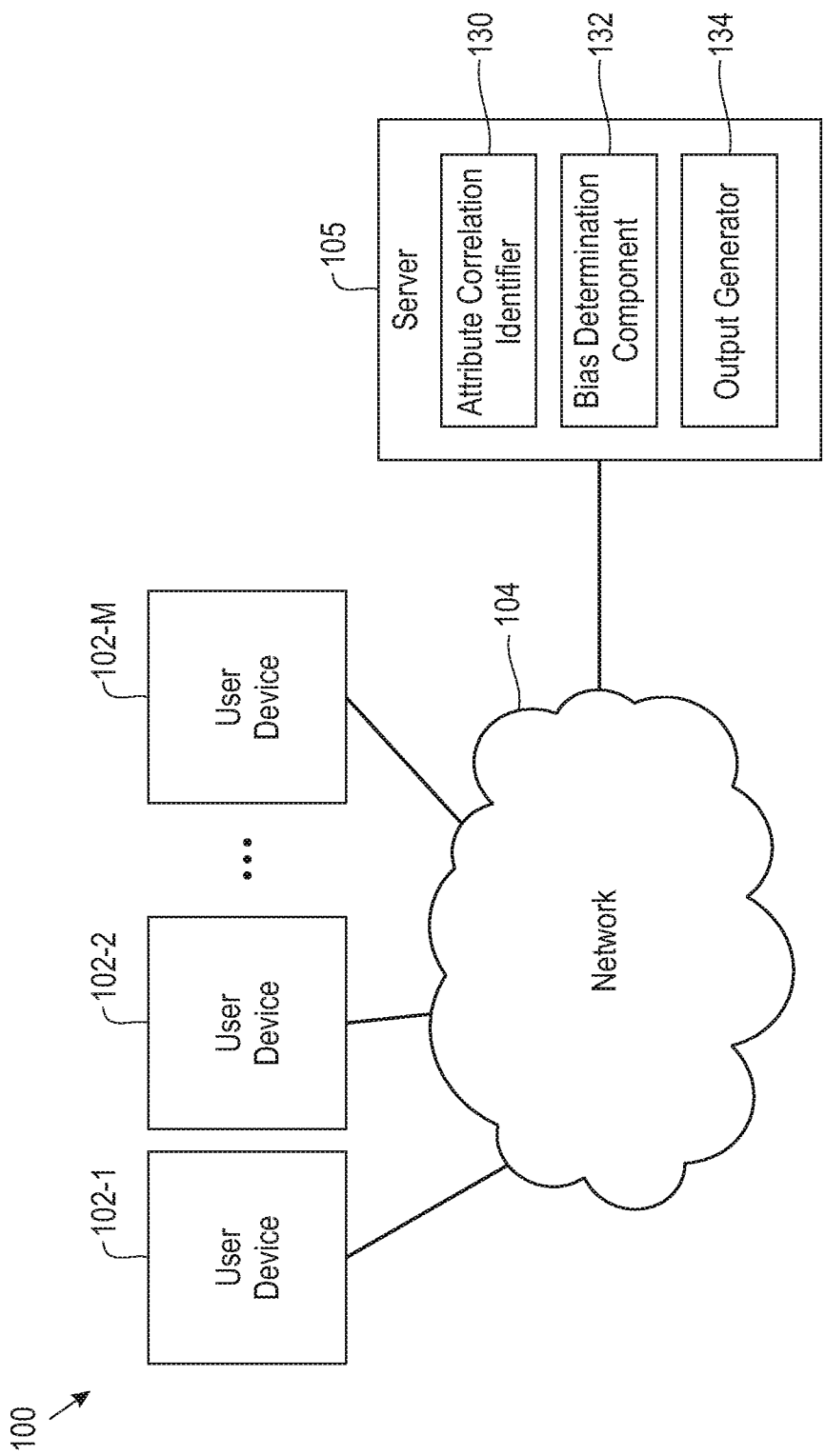
FIG. 1 is a diagram illustrating system architecture, according to an exemplary embodiment of the invention.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is server 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers." As further detailed herein, such user devices 102 can provide datasets to server 105 for processing in connection with bias determinations.

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the server 105 can have an associated database configured to store data pertaining to models and datasets (e.g., bias-related information). The database in such an embodiment is implemented using one or more storage systems associated with the server 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the server 105 are input-output devices, which illustratively comprise keyboards, displays or other types of input-output devices in any combination. Such input-output devices can be used, for example, to support one or more user interfaces to the server 105, as well as to support communication between the server 105 and other related systems and devices not explicitly shown.

The server 105 in the FIG. 1 embodiment is assumed to be implemented using at least one processing device. Each such processing device generally comprises at least one processor and an associated memory, and implements one or more functional modules for controlling certain features of the server 105.

More particularly, the server 105 in such an embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface allows the server 105 to communicate over the network 104 with the user devices 102, and illustratively comprises one or more conventional transceivers.

The processor further comprises an attribute correlation identifier 130, a bias determination component 132, and an output generator 134.

It is to be appreciated that this particular arrangement of elements illustrated in the FIG. 1 embodiment is presented by way of example only, and alternative arrangements can be used in other embodiments. For example, the functionality associated with the modules 130, 132 and 134 in other embodiments can be combined into a single module, or separated across a larger number of modules. As another example, multiple distinct processors can be used to implement different ones of the modules 130, 132 and 134 or portions thereof.

At least portions of the modules 130, 132 and 134 may be implemented at least in part in the form of software that is stored in memory and executed by a processor.

It is to be understood that the particular set of elements shown in FIG. 1 for model bias determination involving user devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing modules 130, 132 and 134 of an example server 105 in computer network 100 will be described in more detail with reference to the flow diagram of FIG. 3.

As detailed herein, at least one embodiment includes detecting group bias as well as individual bias in a model. Detecting group bias (also referred to herein as group discrimination) can include applying at least one algorithm for group bias to model (M) with respect to a dataset (D). In detecting individual bias (also referred to herein as individual discrimination), one or more embodiments include operating under an assumption that individual bias is not possible with respect to a protected attribute (P) on model (M) in connection with dataset (D).

By way of example, consider two samples, $S_1$ and $S_2$, in dataset (D), with both samples containing the same attribute (P) but wherein the value of the attribute (P) is different (minority/majority) in the two samples. Because the attribute (P) is removed from model (M), both inputs (related to the two samples) to the model (M) are the same, which will yield the same result. However, assume that there is a direct correlation such as, for example, demographic (P) zip code (P'); i.e., for some value of the "zip code" attribute, there is a one-to-one mapping with the value of the "demographic" attribute, which means that if the value of the "zip code" attribute changes, perturbation of the value of "demographic" attribute occurs as well for that data point although the model is not trained on the "demographic" attributed column. As used herein, "perturbation" refers to changing a value from an original value to a different value. Consequently, in such an instance, the "zip code" attribute will result in indirect individual bias or discrimination.

Figure 2:
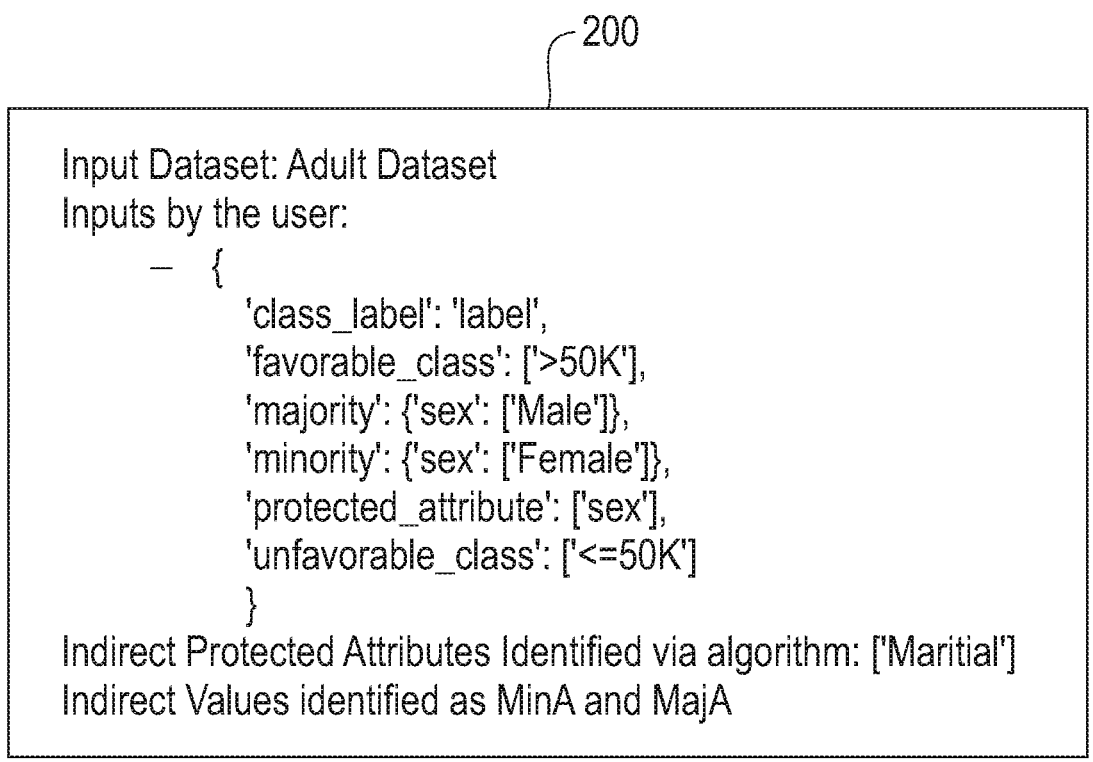
FIG. 2 shows example pseudocode for determining data representative of bias within a model, according to an exemplary embodiment of the invention.

Referring now to FIG. 2, another illustrative embodiment is shown. In this embodiment, pseudocode 200 is executed by or under the control of an information processing system, such as server 105, or another type of information processing system. For example, the pseudocode 200 may be viewed as comprising a portion of a software implementation of at least part of server 105 of the FIG. 1 embodiment.

The pseudocode 200 illustrates an example portion of model bias determination techniques detailed herein. Specifically, the pseudocode 200 details various inputs including class labels and favorability demarcations, as well as majority/minority value designations. Additionally, the pseudocode 200 indicates indirect protected attributes and indirect values.

It is to be appreciated that this particular pseudocode shows just one example implementation of a process for model bias determination, and alternative implementations of the process can be used in other embodiments.

Accordingly, at least one embodiment includes implementing an algorithm to determine and/or identify data points representative of bias in connection with a model. In such an embodiment, the input to the algorithm can include (i) a first dataset (D) with a set of protected attributes (X) and (ii) a second dataset (D') with the set of protected attributes (X) removed on which the model (M) is trained. Also, in one or more embodiments, for each protected attribute (x) in attribute set (X), below-detailed Step 1 and Step 2 are performed.

Above-noted Step 1 includes identifying and/or determining correlated attributes within the set of protected attributes (X). For example, at least one embodiment includes identifying the most correlated attributes within the set of protected attributes (X), so as to limit computation to attributes wherein indirect individual bias possibility is increased. Step 1 also includes cross-validating at least one linear model (e.g., a logistic regression for categorical features and a linear regression for numerical features) with dataset (D), wherein the relevant features include non-protected attributes and the prediction class includes a protected attribute.

Such an embodiment includes selecting the attributes with the maximum/highest weights (representing the most correlated attributes). Additionally, in such an embodiment, the normalized weights (which are greater than a predetermined threshold) of the selected attributes are filtered, resulting in a weight set ($w_x$).

Above-noted Step 2 includes identifying and/or determining individual bias in connection with the model (M). By way of example, assume that "A" is a set of attributes mapped from a protected attribute. Accordingly, Step 2 can include mapping a minority attribute (MinA) to set of values of "A," wherein the values for multiple attributes can be considered as a tuple. Additionally, Step 2 can also include mapping a majority attribute (MajA) to set of values of "A." Further, in at least one embodiment, Step 2 can also include determining an intersection (IntA) of MinA and MajA. Based at least thereupon, one or more embodiments include testing individual bias/discrimination related to perturbation from MinA to/from MajA, utilizing samples with MinA and MajA values that exist. Also, the validity of any such generated row can be checked based, for example, on a validity analysis of the samples, as further described herein.

In connection with mapping and perturbation steps after correlated attributes are identified, one or more embodiments can include the following. In the case of identification of a single (first) attribute being correlated to a single (second) attribute, such an embodiment includes creating a map of all of the majority points of the first attribute to the values of the second attribute. Similarly, such an embodiment includes creating a map of all of the minority points of the first attribute to the values of the second attribute. Accordingly, based at least on these mappings, new indirect majority and minority values can be identified. Further, such an embodiment also includes perturbing the data points containing minority-to-majority and majority-to-minority mappings to determine if individual bias with respect to the model is indicated. If indicated, such data points are then marked to contain indirect individual bias.

In the case of identification of multiple attributes (e.g., a first attribute and a second attribute) being correlated to a given attribute, such an embodiment includes creating a map of all of the majority points of the given attribute to the values of the first attribute and second attribute together. Similarly, such an embodiment includes creating a map of all of the minority points of the given attribute to the values of the first attribute and second attribute together. Accordingly, based at least on these mappings, new indirect majority and minority values can be identified. Further, such an embodiment also includes perturbing the data points containing minority-to-majority and majority-to-minority mappings to determine if individual bias with respect to the model is indicated. If indicated, such data points are then marked to contain indirect individual bias.

As also noted herein, one or more embodiments include performing validity analyses. An example validity analysis, in accordance with such an embodiment, can include constructing a neighbors classifier and/or regressor from a training dataset/feature space (D'). In such an embodiment, checking the validity of a data point includes identifying whether the data point lies in sufficient proximity to one or more original data points. The example validity analysis further includes identifying the points (Q) from training dataset (D') which are the closest to perturbed (new) data point (P). In one or more embodiments, the count of the identified points (Q) can be predetermined (e.g., the count can be varied from 1-5).

Additionally, the example validity analysis includes, after identifying the points (Q) from (D') that represent nearest neighbors to data point (P), calculating the weighted distance between points (Q) and data point (P). In at least one embodiment, the weights represent the normalized correlation coefficient(s) between the correlated attribute and the protected attributed, and/or one or more other features. Accordingly, in such an embodiment, if the weighted distance is less than a given and/or predetermined threshold, then data point (P) is a valid point.

Thus, as detailed herein, after perturbing the data values of indirect majority-to-indirect minority mappings and vice-versa, at least one embodiment includes checking the validity of the perturbed data points, and determining if the model prediction changes. If a class label (associated with the model prediction) changes, such an embodiment identifies and/or marks those data points as being associated with indirect individual bias, and producing such data points as output to at least one user.

Figure 3:
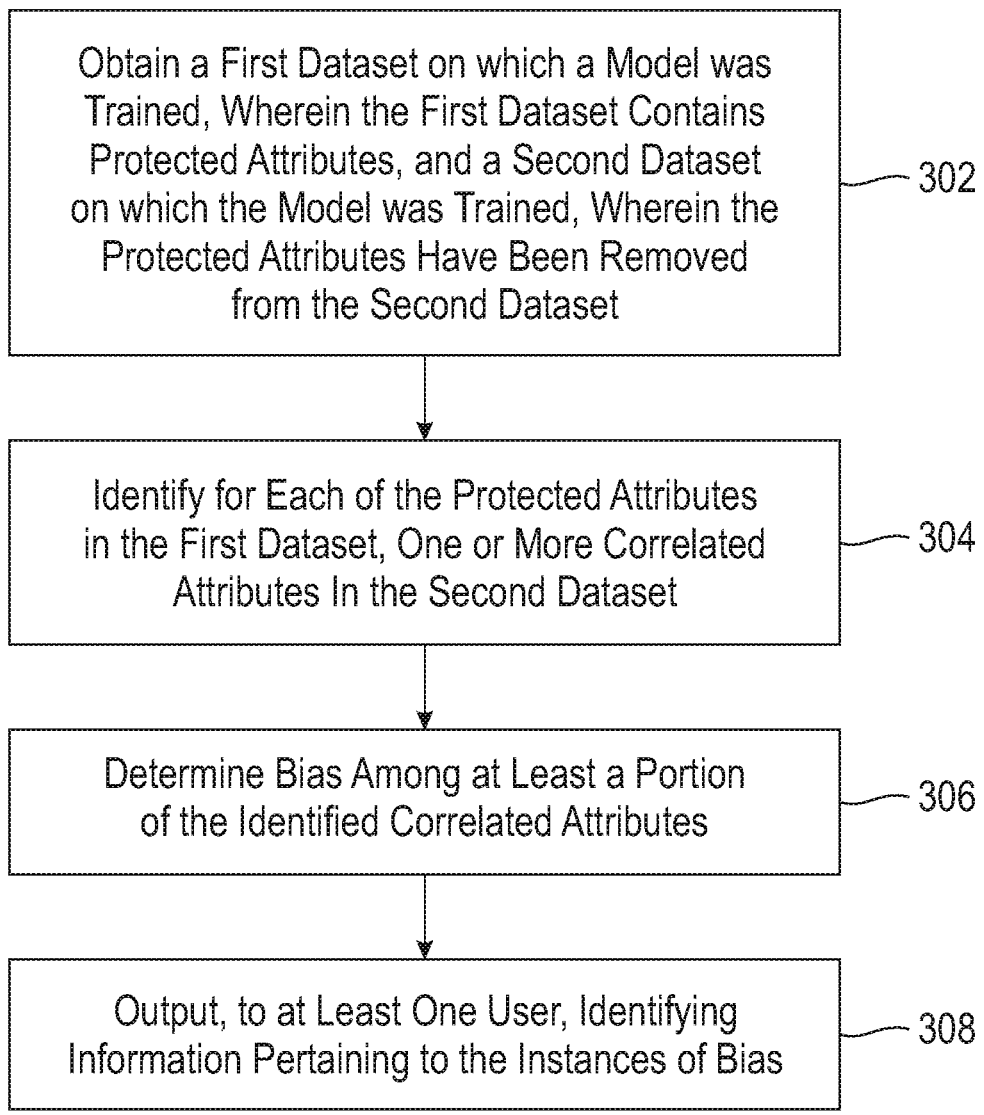
FIG. 3 is a flow diagram illustrating techniques according to an embodiment of the invention.

FIG. 3 is a flow diagram illustrating techniques according to an embodiment of the present invention. Step 302 includes obtaining, as input, (i) a first dataset on which a model was trained, wherein the first dataset contains one or more protected attributes, and (ii) a second dataset on which the model was trained, wherein the one or more protected attributes have been removed from the second dataset.

Step 304 includes identifying for each of the one or more protected attributes in the first dataset, one or more correlated attributes in the second dataset. Identifying the one or more correlated attributes in the second dataset can include cross-validating at least one linear model in connection with at least a portion of the attributes in the second data set and the one or more protected attributes in the first dataset. In at least one embodiment, the linear model can include a logistic regression and/or a linear regression. Additionally, identifying the one or more correlated attributes in the second dataset can include filtering normalized weights corresponding to attributes in the first dataset which are greater than a predetermined threshold.

Step 306 includes determining bias among at least a portion of the identified correlated attributes. Determining bias can include mapping at least two classes of data points associated with the correlated attributes in the second dataset to a set of values associated with the one or more protected attributes in the first dataset, and identifying one or more instances of bias by observing a change to one or more of the values in the mappings in response to modifying one or more class designations among the data points in the mappings. In at least one embodiment, the at least two classes of data points can include a majority class and a minority class, distinguished in accordance with a predetermined threshold value. Also, in one or more embodiments, the one or more instances of bias are represented by one or more data points in at least one of the first dataset and the second dataset.

Step 308 includes outputting, to at least one user, identifying information pertaining to the one or more instances of bias.

Also the techniques depicted in FIG. 3 can also include performing at least one validity analysis on the one or more identified instances of bias. In one or more embodiments, performing the at least one validity analysis includes implementing a nearest neighbors classifier and/or a nearest neighbors regressor.

At least one embodiment can also include identifying, for each of the one or more protected attributes, one or more attributes in the second dataset correlated therewith by cross-validating, in connection with at least a portion of the attributes in the second data set and the one or more protected attributes in the first dataset, a logistic regression model for one or more categorical features and a linear regression model for one or more numerical features. Such an embodiment can also include determining bias among at least a portion of the correlated attributes by: mapping two classes of data points associated with the correlated attributes in the second dataset to a set of values associated with the one or more protected attributes in the first dataset, wherein the two classes of data comprise a majority class and a minority class, distinguished in accordance with a predetermined threshold value; and identifying one or more instances of bias by observing a change to one or more of the values in the mappings in response to modifying one or more class designations among the data points in the mappings. Further, such an embodiment can additionally include carrying out one or more automated actions in connection with the one or more instances of bias.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
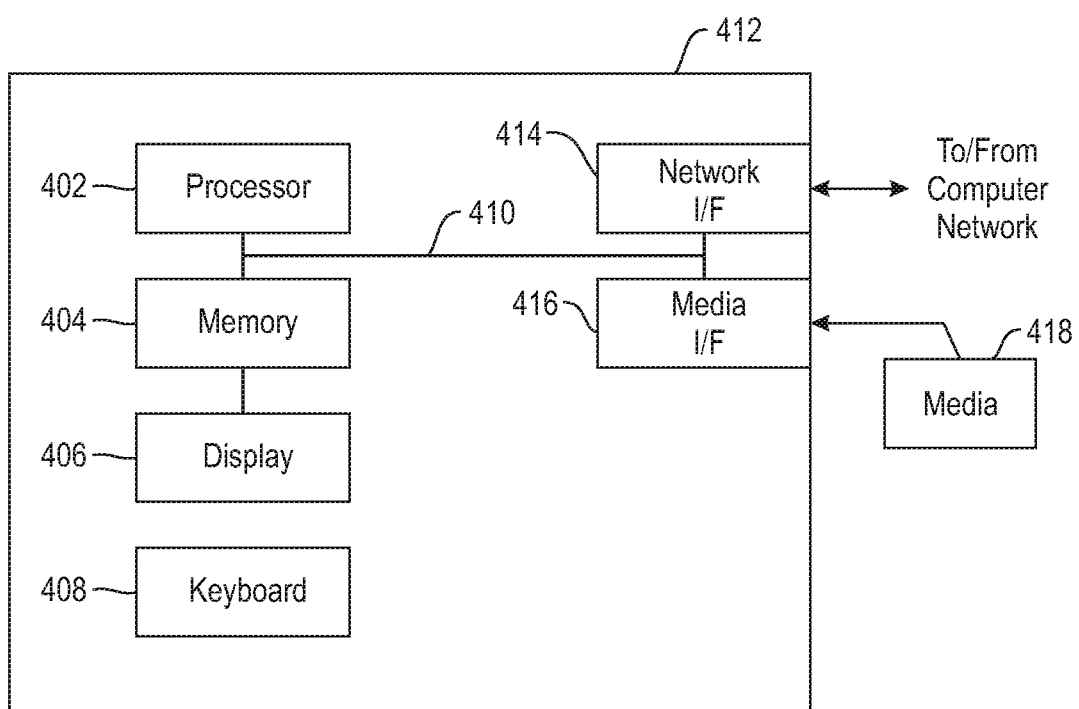
FIG. 4 is a system diagram of an exemplary computer system on which at least one embodiment of the invention can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
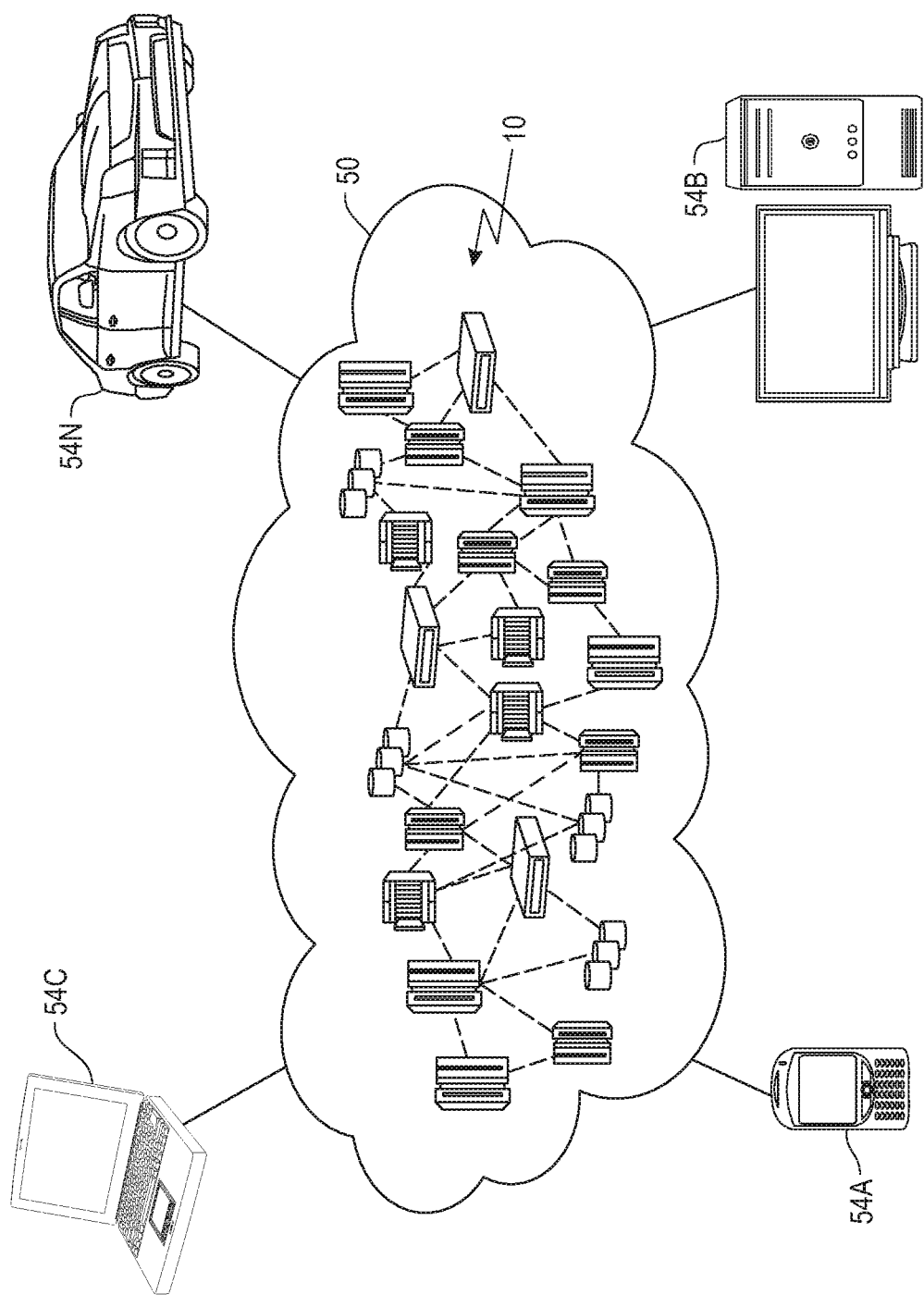
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
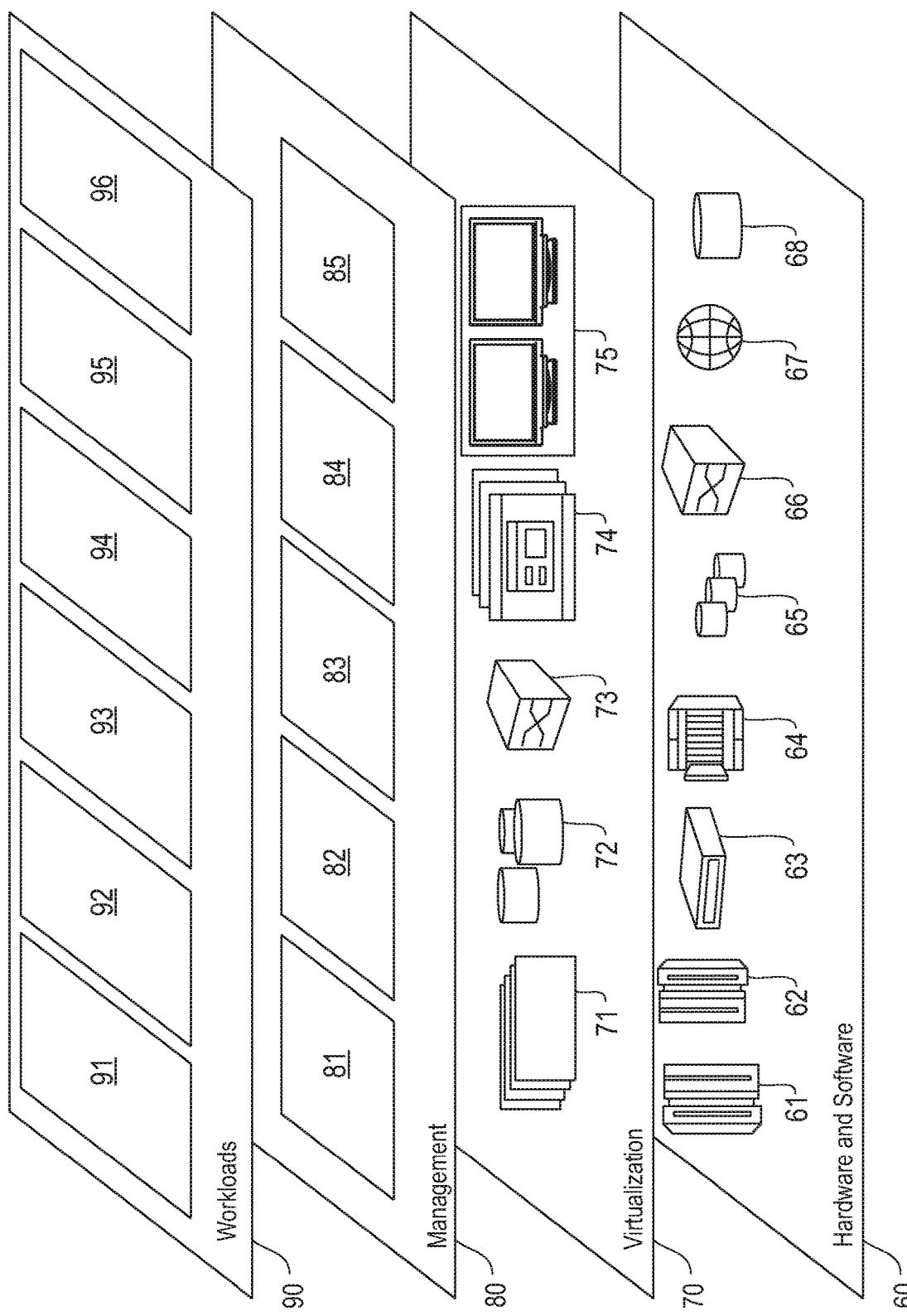
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and model bias determination 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, identifying indirect majority and indirect minority values which are responsible for indirect individual bias.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   obtaining, as input, (i) a first dataset on which a model was trained, wherein the first dataset contains one or more protected attributes, and (ii) a second dataset on which the model was trained, wherein the one or more protected attributes have been removed from the second dataset;
   identifying, for each of the one or more protected attributes in the first dataset, one or more attributes in the second dataset correlated therewith;

determining bias among at least a portion of the identified correlated attributes, wherein said determining comprises:
  mapping at least two classes of data points associated with the correlated attributes in the second dataset to a set of values associated with the one or more protected attributes in the first dataset; and
  identifying one or more instances of bias by observing a change to one or more of the values in the mappings in response to modifying one or more class designations among the data points in the mappings;
outputting, to at least one user, identifying information pertaining to the one or more instances of bias; and
performing at least one validity analysis on the one or more identified instances of bias, wherein said performing the at least one validity analysis comprises:
  training, using at least one training dataset related to the one or more identified instances of bias, and implementing one or more of a nearest neighbors classifier and a nearest neighbors regressor, wherein implementing the one or more of a nearest neighbors classifier and a nearest neighbors regressor comprises identifying, using the one or more of a nearest neighbors classifier and a nearest neighbors regressor, one or more data points from the at least one training dataset which are within a predetermined proximity to at least a portion of the data points in the mappings with one or more modified class designations associated with the one or more instances of bias; and
  calculating at least one weighted distance between (i) the one or more data points from the at least one training dataset which are within a predetermined proximity to at least a portion of the data points in the mappings and (ii) the at least a portion of the data points in the mappings, wherein each weight represents a normalized correlation coefficient between at least one of the correlated attributes and at least one of the one or more protected attributes;
wherein the method is carried out by at least one computing device.

2. The computer-implemented method of claim 1, wherein said identifying the one or more correlated attributes in the second dataset comprises cross-validating at least one linear model in connection with at least a portion of the attributes in the second data set and the one or more protected attributes in the first dataset.

3. The computer-implemented method of claim 2, wherein the at least one linear model comprises a logistic regression.

4. The computer-implemented method of claim 2, wherein the at least one linear model comprises a linear regression.

5. The computer-implemented method of claim 1, wherein said identifying the one or more correlated attributes in the second dataset comprises filtering normalized weights corresponding to attributes in the first dataset which are greater than a predetermined threshold.

6. The computer-implemented method of claim 1, wherein the at least two classes of data points comprise a majority class and a minority class, distinguished in accordance with a predetermined threshold value.

7. The computer-implemented method of claim 1, wherein the one or more instances of bias are represented by one or more data points in at least one of the first dataset and the second dataset.

8. A computer program product comprising a non-transitory computer readable storage medium having program instructions embodied therewith, the program instructions executable by a computing device to cause the computing device to:
  obtain, as input, (i) a first dataset on which a model was trained, wherein the first dataset contains one or more protected attributes, and (ii) a second dataset on which the model was trained, wherein the one or more protected attributes have been removed from the second dataset;
  identify, for each of the one or more protected attributes in the first dataset, one or more attributes in the second dataset correlated therewith;
  determine bias among at least a portion of the identified correlated attributes, wherein said determining comprises:
    mapping at least two classes of data points associated with the correlated attributes in the second dataset to a set of values associated with the one or more protected attributes in the first dataset; and
    identifying one or more instances of bias by observing a change to one or more of the values in the mappings in response to modifying one or more class designations among the data points in the mappings;
  output, to at least one user, identifying information pertaining to the one or more instances of bias; and
  perform at least one validity analysis on the one or more identified instances of bias, wherein said performing the at least one validity analysis comprises:
    training, using at least one training dataset related to the one or more identified instances of bias, and implementing one or more of a nearest neighbors classifier and a nearest neighbors regressor, wherein implementing the one or more of a nearest neighbors classifier and a nearest neighbors regressor comprises identifying, using the one or more of a nearest neighbors classifier and a nearest neighbors regressor, one or more data points from the at least one training dataset which are within a predetermined proximity to at least a portion of the data points in the mappings with one or more modified class designations associated with the one or more instances of bias; and
    calculating at least one weighted distance between (i) the one or more data points from the at least one training dataset which are within a predetermined proximity to at least a portion of the data points in the mappings and (ii) the at least a portion of the data points in the mappings, wherein each weight represents a normalized correlation coefficient between at least one of the correlated attributes and at least one of the one or more protected attributes.

9. The computer program product of claim 8, wherein said identifying the one or more correlated attributes in the second dataset comprises cross-validating at least one linear model in connection with at least a portion of the attributes in the second data set and the one or more protected attributes in the first dataset.

10. The computer program product of claim 9, wherein the at least one linear model comprises one or more of a logistic regression and a linear regression.

11. The computer program product of claim 8, wherein said identifying the one or more correlated attributes in the second dataset comprises filtering normalized weights corresponding to attributes in the first dataset which are greater than a predetermined threshold.

12. A system comprising:
a memory; and
at least one processor operably coupled to the memory and configured for:
obtaining, as input, (i) a first dataset on which a model was trained, wherein the first dataset contains one or more protected attributes, and (ii) a second dataset on which the model was trained, wherein the one or more protected attributes have been removed from the second dataset;
identifying, for each of the one or more protected attributes in the first dataset, one or more attributes in the second dataset correlated therewith;
determining bias among at least a portion of the identified correlated attributes, wherein said determining comprises:
mapping at least two classes of data points associated with the correlated attributes in the second dataset to a set of values associated with the one or more protected attributes in the first dataset; and
identifying one or more instances of bias by observing a change to one or more of the values in the mappings in response to modifying one or more class designations among the data points in the mappings;
outputting, to at least one user, identifying information pertaining to the one or more instances of bias; and
performing at least one validity analysis on the one or more identified instances of bias, wherein said performing the at least one validity analysis comprises:
training, using at least one training dataset related to the one or more identified instances of bias, and implementing one or more of a nearest neighbors classifier and a nearest neighbors regressor, wherein implementing the one or more of a nearest neighbors classifier and a nearest neighbors regressor comprises identifying, using the one or more of a nearest neighbors classifier and a nearest neighbors regressor, one or more data points from the at least one training dataset which are within a predetermined proximity to at least a portion of the data points in the mappings with one or more modified class designations associated with the one or more instances of bias; and
calculating at least one weighted distance between (i) the one or more data points from the at least one training dataset which are within a predetermined proximity to at least a portion of the data points in the mappings and (ii) the at least a portion of the data points in the mappings, wherein each weight represents a normalized correlation coefficient between at least one of the correlated attributes and at least one of the one or more protected attributes.

13. The system of claim 12, wherein said identifying the one or more correlated attributes in the second dataset comprises cross-validating at least one linear model in connection with at least a portion of the attributes in the second data set and the one or more protected attributes in the first dataset.

14. The system of claim 13, wherein the at least one linear model comprises one or more of a logistic regression and a linear regression.

15. The system of claim 12, wherein said identifying the one or more correlated attributes in the second dataset comprises filtering normalized weights corresponding to attributes in the first dataset which are greater than a predetermined threshold.

16. A computer-implemented method comprising:
obtaining (i) a first dataset on which a model was trained, wherein the first dataset contains one or more protected attributes, and (ii) a second dataset on which the model was trained, wherein the one or more protected attributes have been removed from the second dataset;
identifying, for each of the one or more protected attributes, one or more attributes in the second dataset correlated therewith by cross-validating, in connection with at least a portion of the attributes in the second data set and the one or more protected attributes in the first dataset, a logistic regression model for one or more categorical features and a linear regression model for one or more numerical features;
determining bias among at least a portion of the correlated attributes by:
mapping two classes of data points associated with the correlated attributes in the second dataset to a set of values associated with the one or more protected attributes in the first dataset, wherein the two classes of data comprise a majority class and a minority class, distinguished in accordance with a predetermined threshold value; and
identifying one or more instances of bias by observing a change to one or more of the values in the mappings in response to modifying one or more class designations among the data points in the mappings;
carrying out one or more automated actions in connection with the one or more instances of bias; and
performing at least one validity analysis on the one or more identified instances of bias, wherein said performing the at least one validity analysis comprises:
training, using at least one training dataset related to the one or more identified instances of bias, and implementing one or more of a nearest neighbors classifier and a nearest neighbors regressor, wherein implementing the one or more of a nearest neighbors classifier and a nearest neighbors regressor comprises identifying, using the one or more of a nearest neighbors classifier and a nearest neighbors regressor, one or more data points from the at least one training dataset which are within a predetermined proximity to at least a portion of the data points in the mappings with one or more modified class designations associated with the one or more instances of bias; and
calculating at least one weighted distance between (i) the one or more data points from the at least one training dataset which are within a predetermined proximity to at least a portion of the data points in the mappings and (ii) the at least a portion of the data points in the mappings, wherein each weight represents a normalized correlation coefficient between at least one of the correlated attributes and at least one of the one or more protected attributes;
wherein the method is carried out by at least one computing device.

* * * * *